(12) United States Patent
Uchi et al.

(10) Patent No.: US 10,226,887 B2
(45) Date of Patent: Mar. 12, 2019

(54) MOLD APPARATUS AND RESIN MOLDING METHOD

(71) Applicant: HONDA MOTOR CO., LTD., Tokyo (JP)

(72) Inventors: Tomoyuki Uchi, Tochigi (JP); Hiroshi Matsushima, Tochigi (JP); Takashi Abe, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 435 days.

(21) Appl. No.: 14/972,273

(22) Filed: Dec. 17, 2015

(65) Prior Publication Data

US 2016/0185022 A1 Jun. 30, 2016

(30) Foreign Application Priority Data

Dec. 24, 2014 (JP) .................................. 2014-260728

(51) Int. Cl.
*B29C 45/44* (2006.01)
*B29L 31/30* (2006.01)
*B29C 45/26* (2006.01)

(52) U.S. Cl.
CPC ...... *B29C 45/4471* (2013.01); *B29C 45/2681* (2013.01); *B29L 2031/3044* (2013.01)

(58) Field of Classification Search
CPC ............ B29C 45/4471; B29C 45/2681; B29C 2045/4485; B29L 2031/3044
See application file for complete search history.

(56) References Cited

U.S. PATENT DOCUMENTS 3,152,365 A * 10/1964 Fisher ................. B29C 45/2614
249/59
2007/0098935 A1* 5/2007 Farran ..................... B29C 33/48
428/35.7

FOREIGN PATENT DOCUMENTS

| CN | 101879773 A | 11/2010 |
| CN | 201979666 U | 9/2011 |
| JP | S60-064821 U | 5/1985 |
| JP | S61-002914 U | 1/1986 |
| JP | H04-308716 A | 10/1992 |
| JP | 06-114893 | 4/1994 |
| JP | 2009-160885 | 7/2009 |

OTHER PUBLICATIONS

Canadian Office Action dated Dec. 22, 2016, 3 pages.
Chinese Office Action dated Jul. 3, 2017, 7 pages.
Japanese Office Action dated Jul. 19, 2016, 4 pages.
Chinese Office Action dated Mar. 19, 2018, 7 pages.

* cited by examiner

*Primary Examiner* — Galen H Hauth
(74) *Attorney, Agent, or Firm* — Rankin, Hill & Clark LLP

(57) ABSTRACT

The mold apparatus (1) includes: the stationary mold (12) of the mold main body (2) that molds the main body part (81); the rotary core (20) that molds the undercut part (82) and mold releases by rotationally moving in a direction separating from the undercut part (82); and the restricting core (40) that restricts movement of the rotary core (20) sandwiching between the stationary mold (12) and rotary core (20) during molding, and releases restriction of the rotary core (20) by moving in a direction exiting from between the stationary mold (12) and rotary core (20) during mold release of the rotary core (20) from the undercut part (82).

7 Claims, 10 Drawing Sheets

MOLD APPARATUS AND RESIN MOLDING METHOD

This application is based on and claims the benefit of priority from Japanese Patent Application No. 2014-260728, filed on 24 Dec. 2014, the content of which is incorporated herein by reference.

BACKGROUND OF THE INVENTION

Field of the Invention

The present invention relates to a mold apparatus for resin molding a molded article having an undercut part.

Related Art

In a mold apparatus for resin molding a molded article having an undercut part, technology is conventionally known that causes a core molding the undercut part to release from this undercut part by way of rotational movement. For example, Patent Document 1 can be given as a publication disclosing this type of core for releasing from an undercut part by way of rotational movement. In Patent Document 1, technology is disclosed that forms a rotary core so that a slide-contact face with the mold main body is a curve, and causes this rotary core to release from the undercut part by way of causing to revolve along this slide-contact face.

Patent Document 1: Japanese Unexamined Patent Application, Publication No. H6-114893

SUMMARY OF THE INVENTION

However, with mold apparatuses performing resin molding, resin pressure is exerted on the face forming a cavity during molding. Also in the mold apparatus disclosed in Patent Document 1, the force pushing in the rotary core to the mold main body side is acting due to the resin pressure, and thus a state has been entered in which the rotary core is pushed in more to the mold apparatus side than the position at first assumed. As mentioned above, since the rotary core is formed so that a slide-contact face with the mold main body is a curved face, in a state in which the rotary core is pushed into the side of the mold apparatus, even if trying to rotationally move in order to mold release from the undercut part, there has been risk of the pushed in portion of the rotary core interfering with the mold main body, and a mold releasing defect arising in which mold release from the undercut part is not appropriately carried out.

As a method of eliminating such mold releasing defects from the undercut part, it has been considered to design so as to form in advance a gap made by considering the resin pressure between the rotary core and mold main body, so that the rotary core does not interfere with the mold main body during mold release. However, with this method, the rotary core tends to move to a side of the mold apparatus due to resin pressure, whereby a step arises between the rotary core and the mold main body during molding, which becomes a cause for an unintended core line being produced in the molded article.

The present invention has an object of providing a configuration that can effectively prevent the occurrence of core lines caused by resin pressure and movement failure of the rotary core, in a mold apparatus and resin molding method for molding an undercut part by way of a rotary core.

The present invention relates to a mold apparatus (e.g., the mold apparatus 1 described later) for resin molding a molded article (e.g., the molded article 80 described later) that has a main body part (e.g., the main body part 81 described later) and an undercut part (e.g., the undercut part 82 described later), in which the mold apparatus includes: a mold main body (e.g., the stationary mold 12 of the mold main body 2 described later) that molds the main body part; a rotary core (e.g., the rotary core 20 described later) that molds the undercut part, and mold releases by rotationally moving in a direction separating from the undercut part; and a restricting core (e.g., the restricting core 40 described later) that restricts movement of the rotary core by sandwiching between the mold main body and the rotary core during molding, and releases restriction of the rotary core by moving in a direction exiting from between the mold main body and the rotary core during mold release of the rotary core from the undercut part.

Even if an undercut part of a complicated shape, it is thereby possible to cause the rotary core to mold release from the undercut part by way of rotational movement, while the movement of the rotary core to the side of the mold main body is restricted by the restricting core, even if resin pressure is exerted during molding. Therefore, it is possible to effectively prevent a situation in which a core line is produced in the molded article by a step arising between the mold main body and rotary core by the rotary core being pushed in by the resin pressure, whereby the rotary core can no longer be mold released.

It is preferable for a portion (e.g., the restricting core-side contact face 411 described later) of the restricting core that contacts with the rotary core to be formed in a planar shape, and a portion (e.g., the rotary core-side contact face 221 described later) of the rotary core that contacts with the restricting core to be formed in a planar shape.

Since the rotary core and restricting core thereby come to make surface contact, it is possible to properly accept the resin pressure by the restricting core, and thus a pressure-resistant structure that endures the resin pressure with a simple configuration can be realized. In addition, since the rotary core and restricting core come into surface contact, considerations, etc. for design error at the time of contact of the restricting core with the rotary core are also easy, and thus it is possible to optimize the structure of the mold apparatus.

It is preferable for the restricting core is configured so as to move linearly, and a planar portion of the restricting core contacting with the rotary core to be formed so as to slope to a side of the rotary core as advancing in an exiting direction (e.g., the retraction direction of the drive shaft 61 described later) of the restricting core.

Since the contact of the restricting core with the rotary core comes to be promptly released when movement of the restricting core is initiated, compared to a configuration causing the restricting core to move from between the mold main body and rotary core while a state of the rotary core and restricting core contacting is maintained, it is possible to effectively decrease the force required in the movement of the restricting core, and thus a reduction in the size of the drive means (e.g., the drive cylinder 60 described later) can be realized. In addition, even if the rotary core is pushed into a side of the restricting core by way of the resin pressure, it is possible to smoothly perform distancing of the restricting core relative to the rotary core, and thus the molded article can be reliably removed without triggering a mold releasing defect.

It is preferable for the restricting core and the rotary core to be coupled by a cam mechanism (e.g., the cam grooves 24 and cam pins 42 described later) so as to cause the rotary core to rotationally move in a direction separating from the undercut part accompanying movement of the restricting core.

It is thereby possible to make the drive means for causing the restricting core and rotary core to move to be shared, and thus the production cost of the mold apparatus can be effectively reduced.

In addition, the present invention relates to a resin molding method of a molded article (e.g., the molded article 80 described later) having a main body part (e.g., the main body part 81 described later) and an undercut part (e.g., the undercut part 82 described later), in which the method includes the steps of: injection molding a resin in a state sandwiching a restricting core (e.g., the restricting core 40 described later) between a mold main body (e.g., the stationary mold 12 of the mold main body 2 described later) that molds the main body part and a rotary core (e.g., the rotary core 20 described later) that molds the undercut part, and restricting movement of the rotary core by way of the restricting core; and mold releasing by the restricting core releasing restriction of the rotary core by moving in a direction exiting from between the mold main body and the rotary core, and the rotary core for which restriction was released rotationally moving in a direction separating from the undercut part.

The movement of the rotary core to the mold main body side is thereby restricted by the restricting core even if resin pressure is exerted in the molding step, and the rotary core can be made to mold release from the undercut part by way of rotational movement in the mold release step, even if an undercut part of complicated shape. It is thereby possible to effectively prevent a situation in which a core line is produced in the molded article by a step arising between the mold main body and rotary core by the rotary core being pushed in, whereby the rotary core can no longer be mold released.

According to the present invention, it is possible to realize a configuration that can effectively prevent the occurrence of core lines caused by resin pressure and movement failures of the rotary core, in a mold apparatus and resin molding method for molding an undercut part by way of a rotary core.

DETAILED DESCRIPTION OF THE INVENTION

Figure 1:
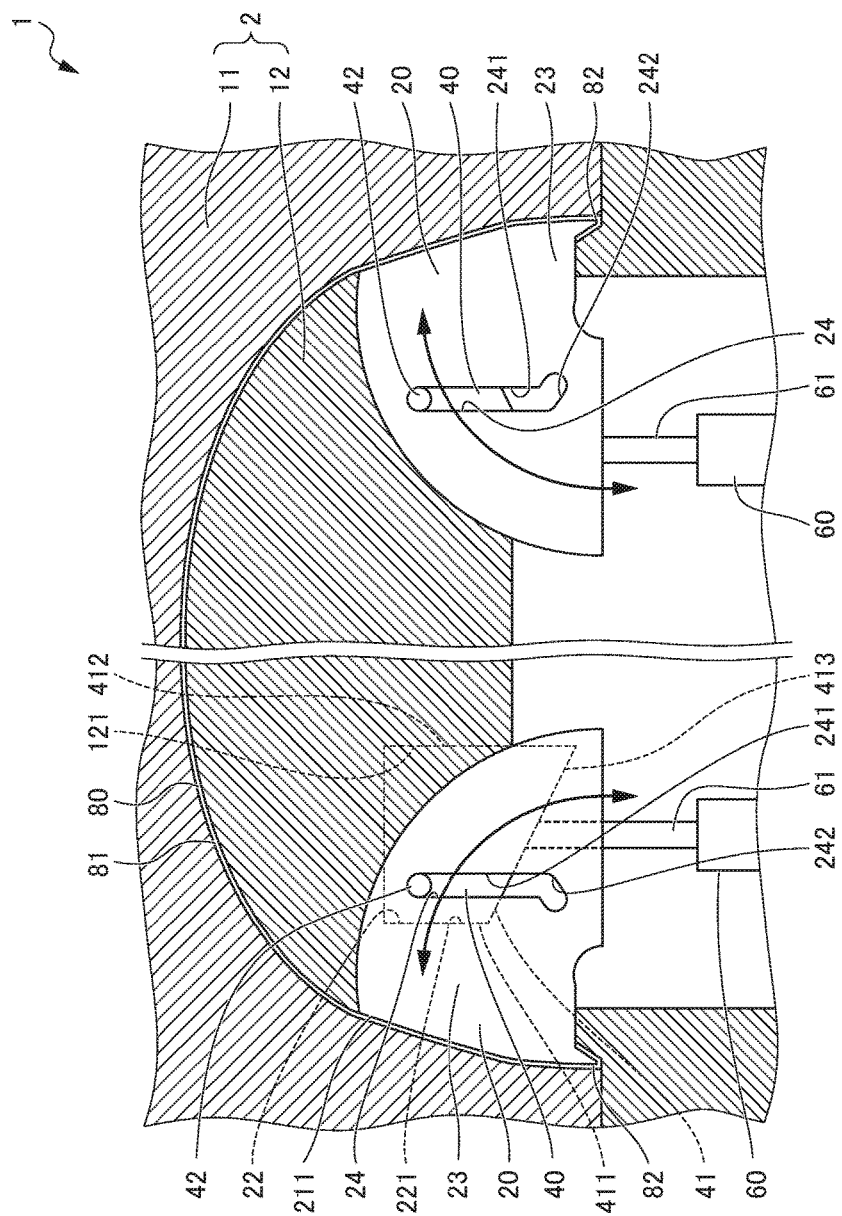
FIG. 1 is a view schematically showing a mold apparatus according to one embodiment of the present invention.

Hereinafter, a preferred embodiment of a mold apparatus of the present invention will be explained while referencing the drawings. FIG. 1 is a view schematically showing a mold apparatus 1 according to an embodiment of the present invention.

The mold apparatus 1 for resin molding a bumper portion of a vehicle as a molded article 80 will be explained as an embodiment of the present invention. As shown in FIG. 1, the molded article 80 consists of a main body part 81, and undercut parts 82 that are formed at the ends of the main body part 81. The undercut parts 82 of the molded article 80 constitute portions for installing the bumper portion to a vehicle body made of metal. The undercut part 82 of the present embodiment has a portion in which a cross-sectional form thereof is molded in a V-shape.

The respective configurations included by the mold apparatus 1 for molding the molded article 80 will be explained. The mold apparatus 1 of the present embodiment includes a mold main body 2, rotary core 20, restricting core 40 and drive cylinder 60, as the main configurations for molding the undercut parts 82 of the molded article 80.

The mold main body 2 forms a cavity for molding portions (main body part 81) other than the undercut parts 82 of the molded article 80. The mold main body 2 of the present embodiment includes a movable mold 11 that mainly molds the face of one side of the molded article 80, and a stationary mold 12 that mainly molds the face (back side face) on the other side of the molded article 80.

The movable mold 11 is configured to be moveable in a direction separating from the stationary mold 12 by way of a drive means (not illustrated). The stationary mold 12 includes a stationary mold housing part 121 in which the rotary core 20 and restricting core 40 for molding the undercut part 82 are housed. The drive cylinder 60 as a drive device for causing the rotary core 20 and restricting core 40 to move is arranged at the stationary mold 12.

In the present embodiment, the restricting core 40 is coupled to the rotary core 20, and a drive shaft 61 of the drive cylinder 60 is connected to this restricting core 40. By the drive shaft 61 of the drive cylinder expanding and contracting, the restricting core 40 moves linearly, and the rotary core 20 moves accompanying the movement of this restricting core 40. It should be noted that the rotary cores 20, restricting cores 40 and drive cylinders 60 are arranged at both right and left sides of the stationary mold 12, respectively.

Figure 2:
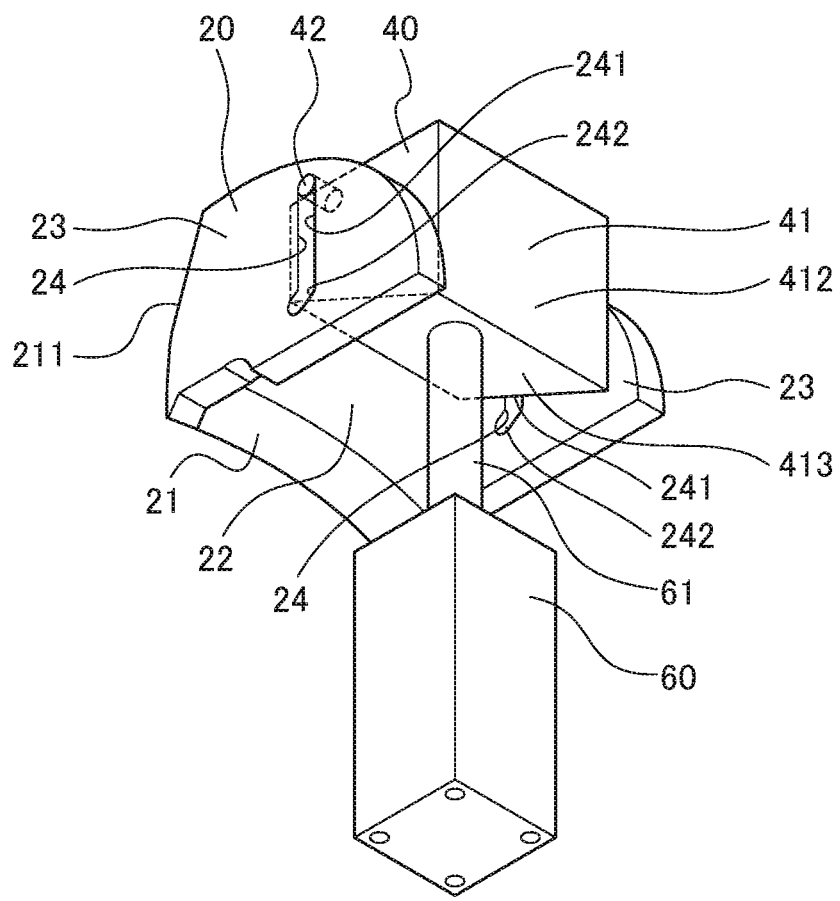
FIG. 2 is a perspective view showing a restricting core that is coupled to a rotary core, and a drive cylinder that is connected to the restricting core.
Figure 3:
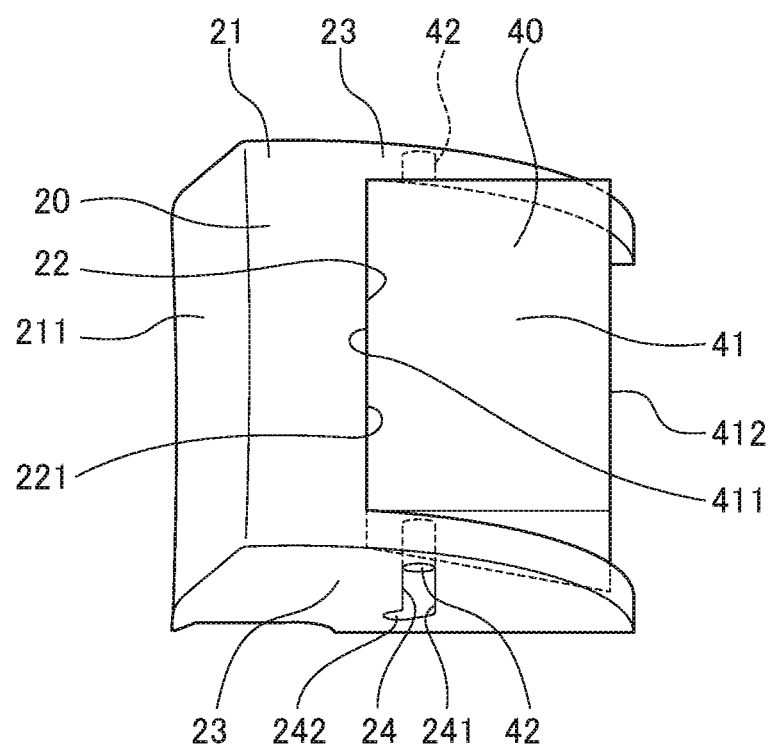
FIG. 3 is a view looking at the rotary core and restricting core from an opposite side of a drive cylinder mounting face of the restricting core.

Next, the detailed configurations of the rotary core 20 and restricting core 40 will be explained. FIG. 2 is a perspective view showing the restricting core 40 that is coupled to the rotary core 20, and the drive cylinder 60 that is connected to the restricting core 40. FIG. 3 is a view looking at the rotary core 20 and restricting core 40 from an opposite side of a drive cylinder mounting face 413 of the restricting core 40.

Figure 4:
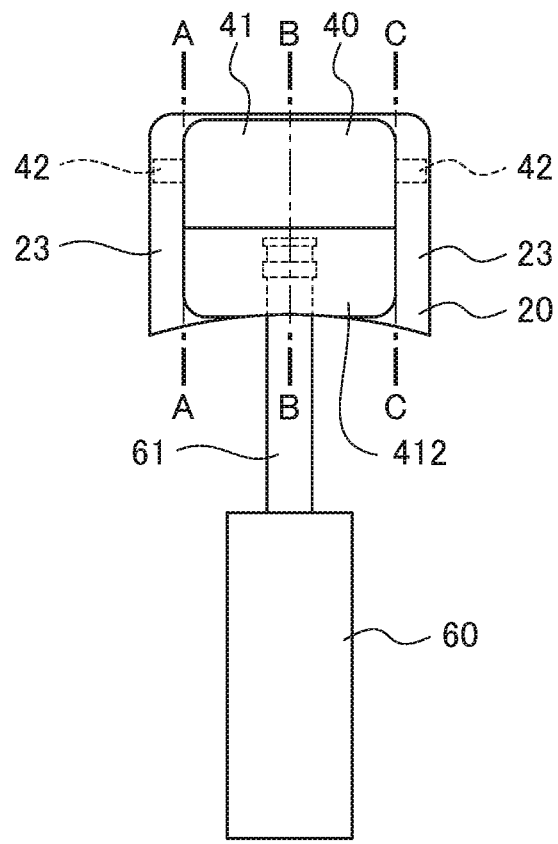
FIG. 4 is a view looking at the rotary core and restricting core from an opposite side of a cavity forming face of the rotary core.

FIG. 4 is a view looking at the rotary core 20 and restricting core 40 from an opposite side of a cavity forming face 211 of the rotary core 20.

The rotary core 20 mainly forms the cavity for molding the undercut part 82 of the molded article 80. As shown in FIGS. 2 to 4, the rotary core 20 of the present embodiment includes a rotary core main body part 21, core housing part 22, side-wall part 23 and cam groove 24.

The rotary core main body part 21 has the cavity forming face 211 for molding the undercut part 82. The cavity for molding the undercut part 82 is formed by this cavity forming face 211. The cavity forming face 211 is formed so that a part of the end thereof projects, thereby making it possible to mold the undercut part 82 having a V-shaped cross-sectional shape.

The core housing part 22 is a portion that houses the restricting core 40. The core housing part 22 is arranged at the other side to the cavity forming face 211 in the rotary core main body part 21. A rotary core-side contact face 221, which is a portion that makes surface contact with the restricting core 40, is formed in the core housing part 22. The rotary core-side contact face 221 of the present embodiment slopes so as to approach the cavity forming face 211 (rotary core 20), as advancing in the retraction direction of the drive shaft 61 (exiting direction of restricting core 40) (refer to FIG. 9).

Figure 5:
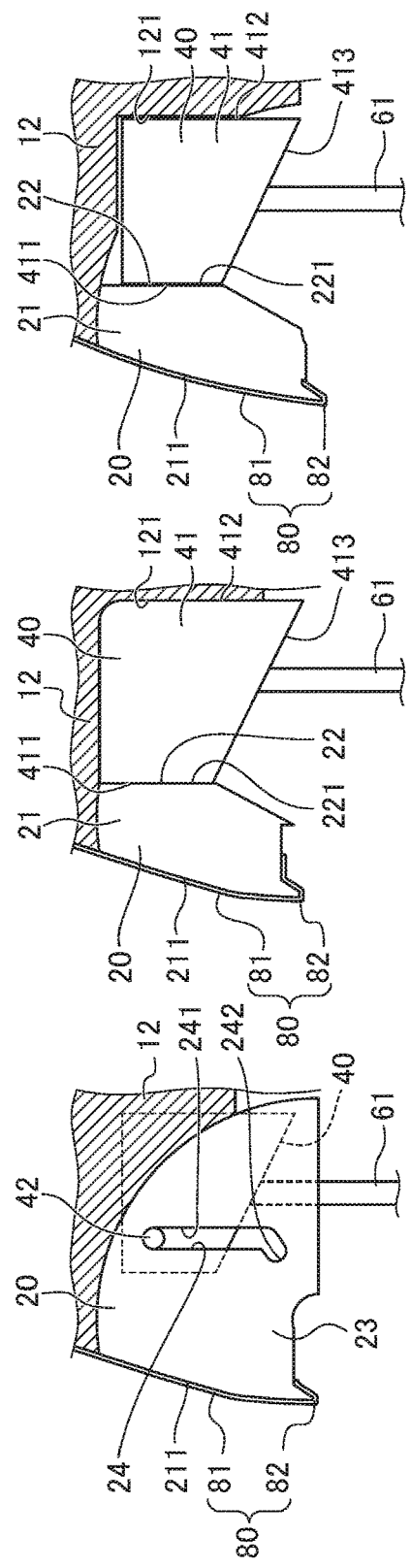
FIGS. 5A, 5B and 5C are views schematically showing aspects of cross-sections of the rotary core and restricting core while molding.
Figure 6:
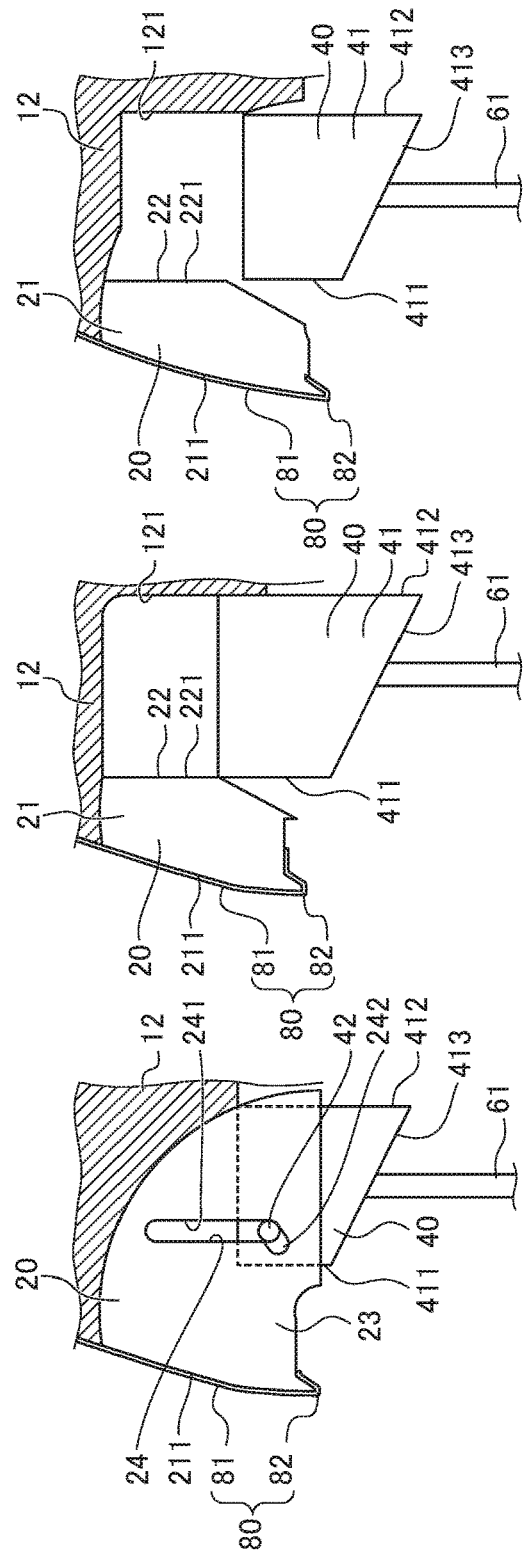
FIGS. 6A, 6B, and 6C are views schematically showing aspects of cross-sections of the rotary core and restricting core while mold releasing.
Figure 7:
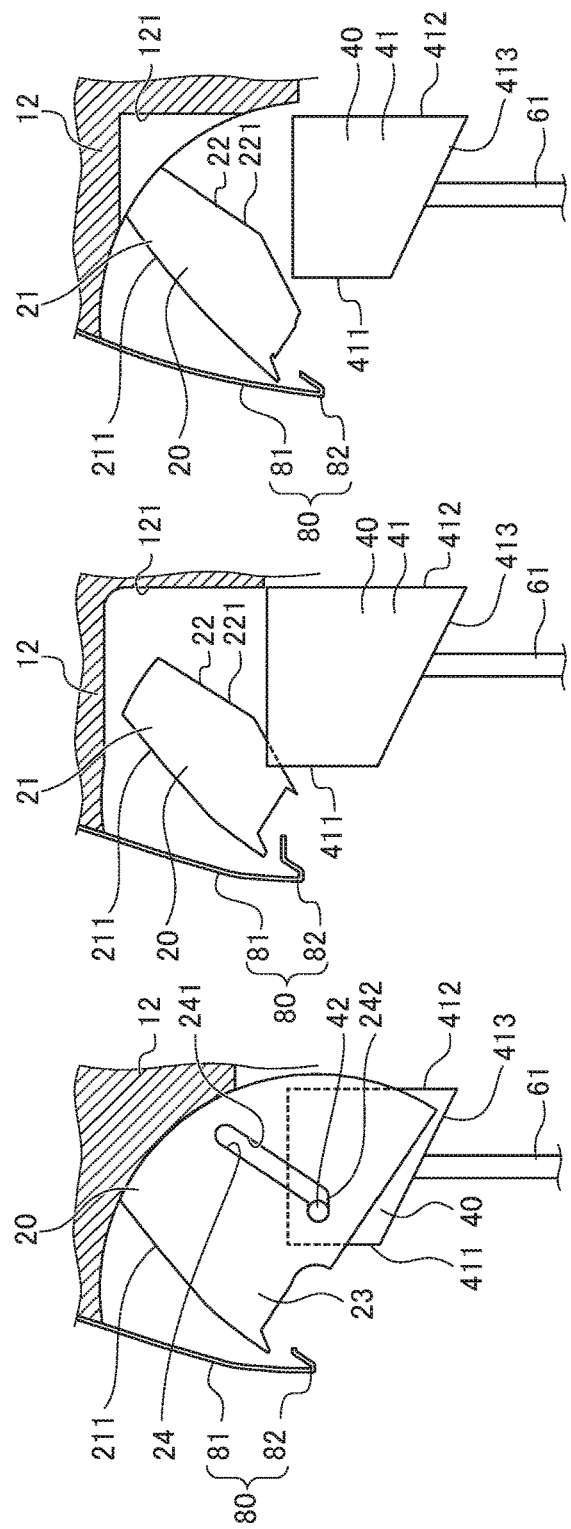
FIGS. 7A, 7B, and 7C are views schematically showing aspects of cross-sections of the rotary core that is rotationally moving and the restricting core.
Figure 8:
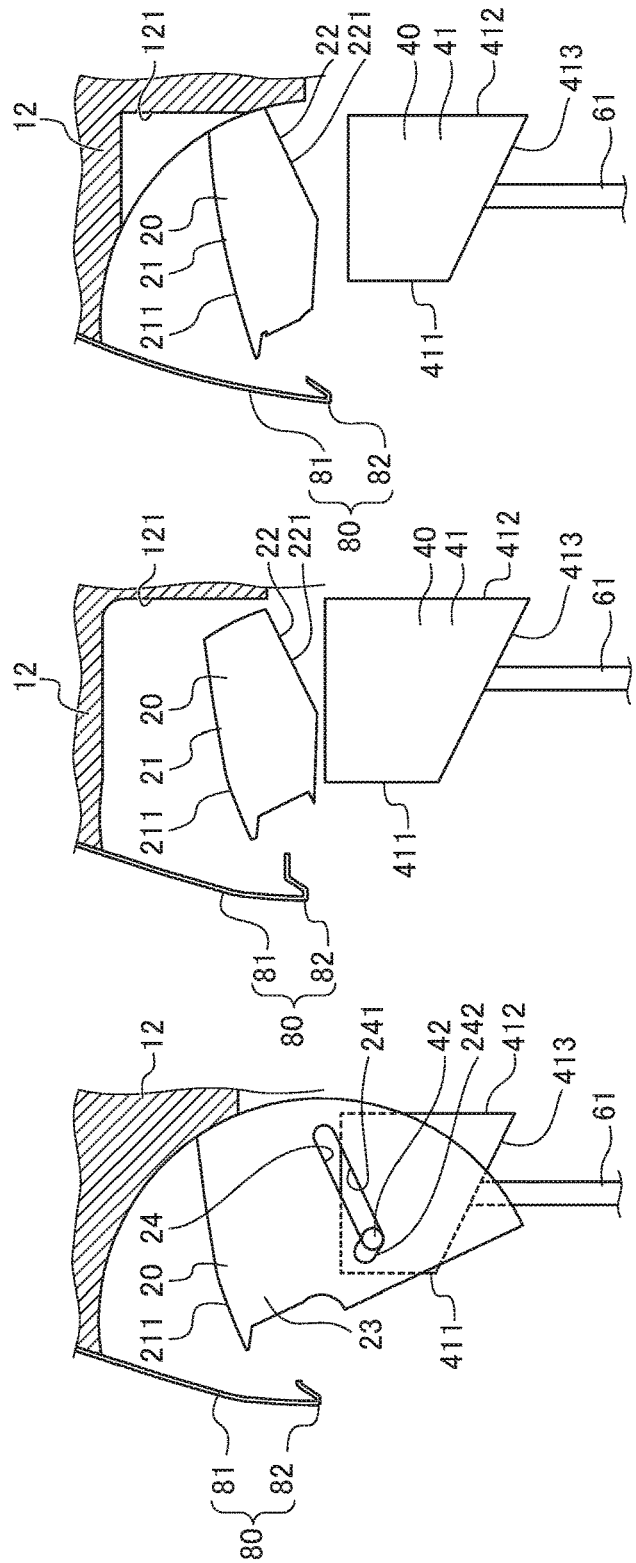
FIGS. 8A, 8B, and 8C are views schematically showing aspects of cross-sections of the rotary core further rotationally moving from the state of FIGS. 7A, 7B, and 7C and the restricting core.

The side-wall part 23 is a face on the other side to the cavity forming face 211 in the rotary core main body part 21, and is formed on both sides of the core housing part 22. The side-wall part 23 is formed in a fan shape in a lateral side view, and has an end face formed in arc shape. The end face formed in the arc shape opposes a stationary-mold housing part 121 (refer to (a) in FIG. 5).

In the present embodiment, a gap is formed between the end face of the side-wall part 23 and the stationary-mold housing part 121. Therefore, during molding and during mold releasing, the side-wall part 23 and the stationary-mold housing part 121 will not be contacting.

The cam groove 24 forms a cam mechanism for coupling the restricting core 40 with the rotary core 20. The cam groove 24 of the present embodiment is configured from a linear part 241 that extends in substantially the same direction as the retraction direction of the drive shaft 61, and a sloped part 242 that slopes from the linear part 241 to a side of the cavity forming face 211. The cam groove 24 is formed at the same position and in the same shape at both sides of the side-wall part 23, respectively.

The principal configurations of the rotary core 20 are as above. Next, the restricting core 40 will be explained. The restricting core includes a restricting core main body part 41 and a cam pin 42.

The restricting core main body part 41 is formed in a block shape. The restricting core main body part 41 has a restricting core-side contact face 411, stationary mold contact face 412 and a drive cylinder mounting face 413.

The restricting core-side contact face 411 is a portion that makes surface contact against the rotary core 20, and is formed in a planar shape. The stationary mold contact face 412 is a portion that contacts the stationary mold 12, and is formed in a planar shape at the other side to the restricting core-side contact face 411 in the restricting core main body part 41. Then, the restricting core-side contact face 411 slopes so as to distance from the side of the stationary mold contact face 412 as advancing in the retraction direction of the drive shaft 61 (refer to FIG. 9).

The drive cylinder mounting face 413 is a face having one side thereof connected to the restricting core-side contact face 411, while the other side is connected to the stationary mold contact face 412. The drive cylinder 60 is connected to this drive cylinder mounting face 413. The drive cylinder mounting face 413 of the present embodiment slopes so as to approach in the retraction direction of the drive cylinder 60 as approaching the stationary mold contact face 412 from the restricting core-side contact face 411.

The cam pin 42 is formed in both side faces of the restricting core main body part 41. The face at which the cam pin 42 is formed is a face connecting the stationary mold contact face 412 with the restricting core-side contact face 411. By the cam pins 42 being inserted into the cam grooves 24 of the rotary core 20, the rotary core 20 is coupled with the restricting core 40.

The rotary core 20 and restricting core 40 possessed by the mold apparatus 1 of the present embodiment are configured as above. Next, the operations of injection molding (molding step) and mold release (mold releasing step) by the mold apparatus 1 of the present embodiment will be explained in stages while referencing FIGS. 5 to 10.

FIGS. 5A-5C are views schematically showing aspects of cross-sections of the rotary core 20 and restricting core 40 while molding (molding step). Thereamong, FIG. 5A is a cross-sectional view along the line A-A of FIG. 4. FIG. 5B is a cross-sectional view along the line B-B of FIG. 4. FIG. 5C is a cross-sectional view along the line C-C of FIG. 4.

As shown in FIG. 5A, during molding, the end face of the side-wall parts 23 positioned at both end parts of the rotary core 20 enter a state opposing an inner wall of the stationary mold housing part 121. As mentioned above, the rotary core 20 and stationary mold 12 are designed so that a gap is formed between the end face of the side-wall part 23 and the stationary mold housing part 121 (stationary mold 12) also during this molding. On the other hand, as shown in FIG. 5B and FIG. 5C, the rotary core-side contact face 221 and restricting core-side contact face 411 enter a state making surface contact, thereby restricting the movement of the rotary core 20 in a direction separating from the undercut part 82. By being restricted by the restricting core 40, the position of the rotary core 20 during molding is appropriately maintained. In this state, injection molding of resin is performed.

The force exerted on the cavity forming face 211 of the rotary core 20 is accepted by the restricting core-side contact face 411 making surface contact with the rotary core 20. As shown in FIG. 5B, the restricting core 40 makes surface contact also with the stationary mold housing part 121 by way of the stationary mold contact face 412, and thus accepts the resin pressure received via the rotary core 20 while being supported by the stationary mold housing part 121, thereby making it possible to appropriately maintain the position of the rotary core 20 in the molding step.

In addition, in the present embodiment, since a gap is formed between the end face of the side-wall part 23 formed in a curved surface and the stationary mold housing part 121, the side-wall part 23 will not be pushed into the stationary mold 12 side even when receiving the resin pressure against the cavity forming face 211. Therefore, a situation in which the curved portion of the side-wall part 23 is pushed into the stationary mold 12 side and becomes a hindrance to the rotational movement is reliably prevented.

FIGS. 6A-6C are views schematically showing aspects of cross-sections of the rotary core 20 and restricting core 40 during mold release. FIGS. 6A, 6B, and 6C correspond to the cross-sectional views of FIGS. 5A, 5B, and 5C, respectively. As shown in FIGS. 6A-6C, when molding finishes and mold release is initiated, the drive cylinder 60 is driven as that the drive shaft 61 retracts. The restricting core 40 thereby linearly moves in a direction separating from the stationary mold housing part 121. At this time, the cam pins 42 move integrally with the restricting core 40 along the linear parts 241 of the cam grooves 24 (refer to FIG. 6A).

Figure 9:
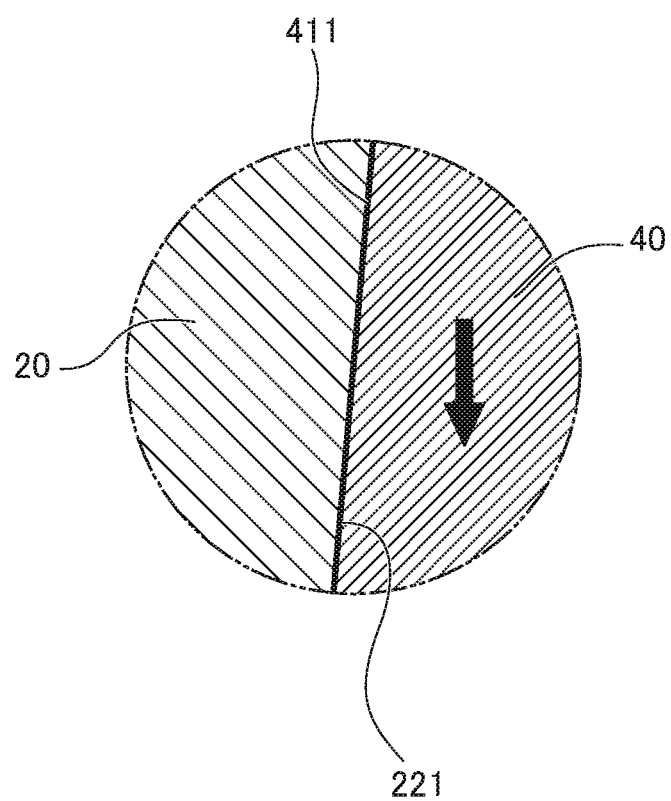
FIG. 9 is an enlarged cross-sectional view schematically showing a contact state between the rotary core and restricting core while molding.

Herein, the release of contact (restriction) of the restricting core-side contact face 411 with the rotary core-side contact face 221 will be explained by referencing FIG. 9. FIG. 9 is an enlarged cross-sectional view showing the contact state of the restricting core 40 with the rotary core 20 during molding. As shown in FIG. 9, the rotary core-side contact face 221 and restricting core-side contact face 411 both slope so as to approach the cavity forming face 211 as advancing in the movement direction (direction of arrow in FIG. 9) of the restricting core 40.

When the restricting core 40 thereby moves in the retraction direction of the drive shaft 61 from the state shown in FIG. 9, the contact of the restricting core-side contact face 411 with the rotary core-side contact face 221 is promptly released along with the movement start of the restricting core 40, and the distancing of the rotary core-side contact face 221 and restricting core-side contact face 441 is smoothly performed. For example, when considering a case of the rotary core-side contact face and restricting core-side contact face being formed so as to follow the movement direction of the restricting core, even when the restricting core starts movement, the rotary core-side contact face and restricting core-side contact face will remain in contact. For this reason, a driving force considering the friction force occurring between the rotary core-side contact face and restricting core-side contact face becomes necessary in the drive cylinder that is being used in the configuration in which the contacting faces of the rotary core and restricting core are formed linearly. In this point, with the mold apparatus 1 of the present embodiment, since both the rotary core-side contact face 221 and restricting core-side contact face 411 are sloping, a gap is produced between the rotary core-side contact face 221 and restricting core-side contact face 411 along with movement start of the restricting core 40, and thus the drive force required in order to cause the restricting core 40 to move in the retraction direction also can be reduced.

Furthermore, in the present embodiment, since the drive cylinder mounting face 413 slopes so as to approach the retraction direction of the drive cylinder 60 as approaching the stationary mold contact face 412 from the restricting core-side contact face 411, compared to the case of the restricting core 50 being formed in a rectangular shape, it is possible to make the contacting face of the rotary core 20 with the restricting core 40 smaller, thereby making an apparatus in which the distancing of the rotary core 20 and restricting core 40 is smoother.

FIGS. 7A-7C are views schematically showing aspects of cross-sections of the rotary core 20 that is rotationally moving and the restricting core 40. FIGS. 7A, 7B, and 7C correspond to FIGS. 5A, 5B, and 5C, respectively. As shown in FIGS. 7A-7C, when the restricting core 40 further advances in the retraction direction of the drive shaft 60 from the state shown in FIGS. 6A-6C, the cam pins 42 arrive at the starting end of the sloped part 242, which is an elbow part of the cam groove 24. The starting end of the sloped part 242 (connecting portion of the linear part 241 and sloped part 242) is pressed in the retraction direction by the cam pin 42, whereby the rotary core 20 begins to rotationally move in a direction separating from the undercut part 82.

Figure 10:
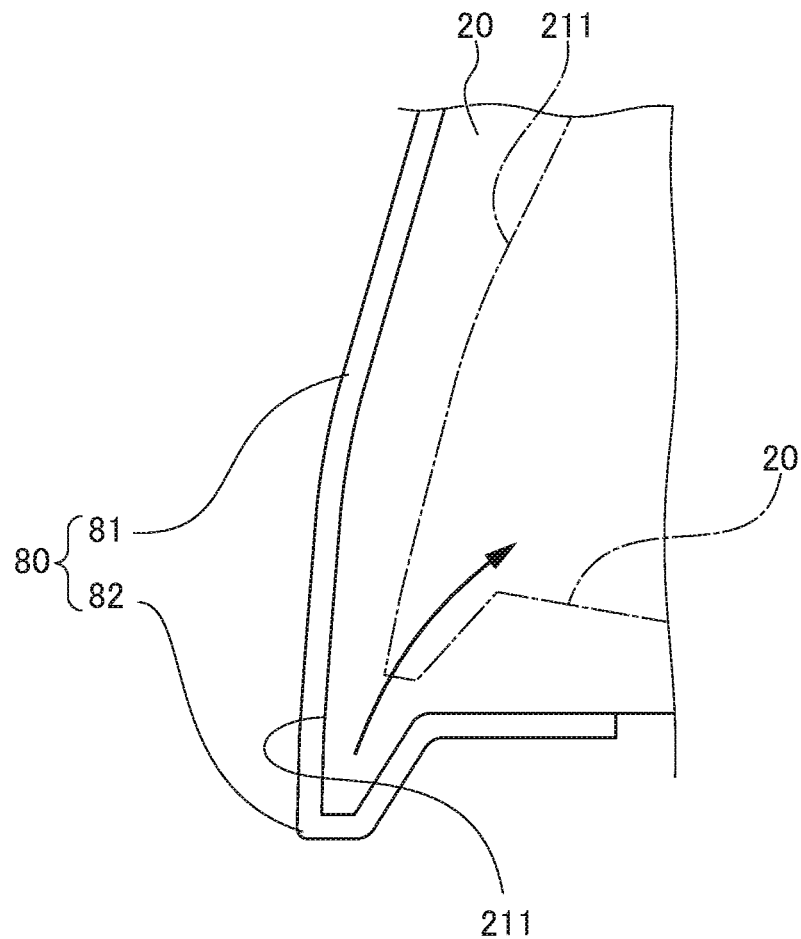
FIG. 10 is an enlarged cross-sectional view showing an aspect of the rotary core mold releasing from the undercut part.

FIG. 10 is an enlarged cross-sectional view showing an aspect of the rotary core 20 mold releasing from the undercut part 82. As shown in FIG. 10, by the rotary core 20 rotationally moving rearwards (side of stationary mold 12) accompanying the downward movement of the restricting core 40, the end of the cavity forming face 211 of the rotary core 20 becomes able to mold release without interfering with the undercut part 82. As in the present embodiment, even if an undercut part 82 of a complicated shape having a cross-sectional shape formed in a V-shape, since the rotary core 20 rotationally moves so as to avoid the undercut part 82, it becomes possible to efficiently perform the movement required in mold release.

FIGS. 8A-8C are views schematically showing aspects of the cross-sections of the rotary core 20 having further rotationally moved from the state of FIGS. 7A-7C and the restricting core 40. FIGS. 8A, 8B, and 8C correspond to FIGS. 5A, 5B, and 5C, respectively. As shown in FIGS. 8A-8C, when the restricting core 40 moves downwards further from the state shown in FIGS. 7A-7C, the cam pins 42 cause the rotary core 20 to further move rearwards while moving from the starting end of the sloped part 242 to a finishing end, and then the distancing of the rotary core 20 from the undercut 82 finishes.

After mold release completion of the rotary core 20, removal of the molded article 80 becomes possible by causing the movable mold 11 to move in a direction separating from the stationary mold 12. It should be noted that it may be made a configuration that performs mold release of the rotary core 20, after causing the movable mold 11 to move in the direction separating from the stationary mold 12. The removal method of the molded article 80 can adopt an appropriate method such as using an extrusion core and pick-up device.

The following such effects are exerted according to the mold apparatus 1 of the present embodiment explained above.

The mold apparatus 1 of the present embodiment includes: the stationary mold 12 of the mold main body 2 that molds the main body part 81; the rotary core 20 that molds the undercut part 82 and mold releases by rotationally moving in a direction separating from the undercut part 82; and the restricting core 40 that restricts movement of the rotary core 20 by sandwiching between the stationary mold 12 and rotary core 20 during molding, and releases restriction of the rotary core 20 by moving in a direction exiting from between the stationary mold 12 and rotary core 20 (retraction direction of the drive shaft 61) during mold release of the rotary core 20 from the undercut part 82.

Even if an undercut part 82 of a complicated shape such as that having a V-shaped cross-sectional shape, it is thereby possible to cause the rotary core 20 to mold release from the undercut part 82 by way of rotational movement, while the movement of the rotary core 20 to the side of the stationary mold 12 is restricted by the restricting core 40, even if resin pressure is exerted during molding. Therefore, it is possible to effectively prevent a situation in which a core line is formed by a step arising between the stationary mold 12 and rotary core 20 by the rotary core 20 being pushed in by the resin pressure, whereby the rotary core 20 can no longer be mold released.

In the present embodiment, the restricting core-side contact face 411 of the restricting core 40 is formed in a planar shape, as well as the rotary core-side contact face 221 of the rotary core 20 being formed in a planar shape.

Since the rotary core 20 and restricting core 40 thereby come to make surface contact, it is possible to properly accept the resin pressure by the restricting core 40, and thus a pressure-resistant structure that endures the resin pressure with a simple configuration can be realized. In addition, since the rotary core 20 and restricting core 40 come into surface contact, considerations, etc. for design error at the time of contact of the restricting core 40 with the rotary core 20 are also easy, and thus it is possible to optimize the structure of the mold apparatus 1.

In the present embodiment, the restricting core 40 is configured so as to move linearly, the planar portion of the restricting core 40 contacting with the rotary core 20 is formed so as to slope to the side of the rotary core 20 as advancing in the exiting direction of the restricting core 40 (retraction direction of the drive shaft 61).

Since the contact of the restricting core 40 with the rotary core 20 comes to be promptly released when movement of the restricting core 40 is initiated, compared to a configuration causing the restricting core 40 to move from between the stationary mold 12 and rotary core 20 while a state of the rotary core 20 and restricting core 40 contacting is maintained, it is possible to effectively decrease the force required in the movement of the restricting core 40, and thus the drive means such as the drive cylinder 60 can be reduced in size. In addition, even if the rotary core 20 is pushed into a side of the restricting core 40 by way of the resin pressure, it is possible to smoothly perform distancing of the restricting core 40 relative to the rotary core 20, and thus the molded article 80 can be reliably removed without triggering a mold releasing defect.

In the present embodiment, the restricting core 40 and rotary core 20 are coupled by a cam mechanism consisting of the cam pins 42 and cam grooves 24 so as to cause the rotary core 20 to rotationally move in a direction separating from the undercut part 82 accompanying movement of the restricting core 40.

It is thereby possible to make the drive means for causing the restricting core 40 and rotary core 20 to move to be shared, and thus the production cost of the mold apparatus 1 can be effectively reduced.

Although a preferred embodiment of a mold apparatus of the present invention is explained above, the present invention is not to be limited to the aforementioned embodiment, and modifications thereto are possible where appropriate.

The rotary core 20 of the above-mentioned embodiment has the side-wall parts 23 arranged at both ends formed in fan shapes; however, it is not limited to this configuration. For example, the portion corresponding to the side-wall part 23 of the rotary core 20 of the present invention may be modified to another shape such as a rectangular shape. In this case, it is preferable for an adequate gap to be provided between the end face of the side-wall part and the stationary mold so that the portion corresponding to the side-wall part 23 does not contact with the stationary mold 12 during mold release from the undercut part.

In the above-mentioned embodiment, an explanation was made with the mold apparatus 1 for molding the bumper portion of a vehicle as the molded article 80 as an example; however, it is not to be limited to this example, and it is possible to apply the present invention so long as being a mold apparatus that produces a molded article having an undercut part.

What is claimed is:

1. A mold apparatus for resin molding a molded article that has a main body part and an undercut part; the mold apparatus comprising:
   a mold main body that molds the main body part;
   a rotary core that molds the undercut part, and mold releases by rotationally moving in a direction separating from the undercut part; and
   a restricting core that restricts movement of the rotary core by sandwiching between the mold main body and the rotary core during molding, and releases restriction of the rotary core by moving in a direction exiting from between the mold main body and the rotary core during mold release of the rotary core from the undercut part,
   wherein the rotary core includes:
   a rotary core main body part having a cavity forming face that molds the undercut part; and
   a core housing part that is arranged opposite the cavity forming face in the rotary core main body part, and in which a rotary core-side contact face contacts the restricting core and is formed in a planar shape, and
   wherein the restricting core includes:
   a stationary mold contact face that contacts the mold main body, is laterally opposite a restricting core-side contact face formed in a planar shape that contacts the rotary core, and is formed in a planar shape on a back side of the restricting core.

2. The mold apparatus according to claim 1, wherein the rotary core includes a side-wall part which is a face opposite the cavity forming face in the rotary core main body part, and is formed on both sides of the core housing part.

3. The mold apparatus according to claim 1, wherein the restricting core is configured so as to move linearly, and
   wherein a planar portion of the restricting core contacting with the rotary core is formed so as to slope to a side of the rotary core as advancing in an exiting direction of the restricting core.

4. The mold apparatus according to claim 1, wherein the restricting core and the rotary core are coupled by a cam mechanism so as to cause the rotary core to rotationally move in a direction separating from the undercut part accompanying movement of the restricting core.

5. The mold apparatus according to claim 2, wherein the restricting core and the rotary core are coupled by a cam mechanism so as to cause the rotary core to rotationally move in a direction separating from the undercut part accompanying movement of the restricting core.

6. The mold apparatus according to claim 3, wherein the restricting core and the rotary core are coupled by a cam mechanism so as to cause the rotary core to rotationally move in a direction separating from the undercut part accompanying movement of the restricting core.

7. The mold apparatus according to claim 1, wherein the stationary mold contact face and the restricting core-side contact face laterally oppose each other on an axis perpendicular to a retraction direction of a drive shaft.

* * * * *